United States Patent
Zhao (10) Patent No.: US 10,606,159 B2
(45) Date of Patent: Mar. 31, 2020

(54) METHOD AND APPARATUS FOR CONTROLLING PROJECTOR

(71) Applicant: Baidu Online Network Technology (Beijing) Co., Ltd., Beijing (CN)

(72) Inventor: Chen Zhao, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 0 days.

(21) Appl. No.: 16/294,503

(22) Filed: Mar. 6, 2019

(65) Prior Publication Data

US 2019/0302597 A1 Oct. 3, 2019

(30) Foreign Application Priority Data

Mar. 27, 2018 (CN) .......................... 2018 1 0258187

(51) Int. Cl.
| | | |
|---|---|---|
| *G03B 21/14* | (2006.01) | |
| *G03B 21/28* | (2006.01) | |
| *G03B 21/20* | (2006.01) | |
| *G03B 21/00* | (2006.01) | |

(52) U.S. Cl.
CPC ....... *G03B 21/2046* (2013.01); *G03B 21/003* (2013.01); *G03B 21/142* (2013.01); *G03B 21/2053* (2013.01); *G03B 21/2066* (2013.01); *G03B 21/28* (2013.01)

(58) Field of Classification Search
CPC .......................... G03B 21/2046; G03B 21/28; G03B 21/2053; G03B 21/142; G03B 21/2066; G03B 21/008; G03B 21/003; H04N 9/3129
See application file for complete search history.

(56) References Cited

U.S. PATENT DOCUMENTS

| | | | |
|---|---|---|---|
| 9,456,172 B2 * | 9/2016 | Naftali | G02B 26/101 |
| 2015/0036105 A1 * | 2/2015 | Ide | H04N 9/3129 353/31 |
| 2018/0284284 A1 * | 10/2018 | Curatu | G01S 17/10 |
| 2019/0222815 A1 * | 7/2019 | Watanabe | G03B 21/00 |
| 2019/0302581 A1 * | 10/2019 | Zhao | G03B 21/142 |

* cited by examiner

*Primary Examiner* — William C. Dowling
(74) *Attorney, Agent, or Firm* — Nixon Peabody LLP (57) ABSTRACT

A method and apparatus for controlling a projector are provided. A specific embodiment of the method includes: determining position information of a target position in a to-be-projected area; determining a scanning power of scanning the target position based on a pre-generated scanning power table and the position information of the target position, the scanning power table used for characterizing a corresponding relationship between the scanning power and the position information; adjusting a tilt angle of a reflector to change the tilt angle of the reflector, and to enable a light beam incident onto the reflector to be reflected to the target position; and controlling a light source to emit the light beam to the reflector at the determined scanning power. The embodiment has achieved scanning a to-be-projected area at an adjustable scanning power.

12 Claims, 9 Drawing Sheets

METHOD AND APPARATUS FOR CONTROLLING PROJECTOR

CROSS-REFERENCE TO RELATED APPLICATIONS

This application claims priority to Chinese Patent Application no. 201810258187.3, filed in China on Mar. 27, 2018, the contents of which are incorporated herein by reference in their entirety.

TECHNICAL FIELD

Embodiments of the disclosure relate to the field of computer technology, and specifically to a method and apparatus for controlling a projector.

BACKGROUND

Depth sensing is widely used in many fields, such as autonomous driving, and three-dimensional scene reconstruction.

The active depth measurement method is a method for acquiring depth information. The active depth measurement method may include a monocular structured light measurement method and a Time of Flight (TOF) measurement method. The principle of the monocular structured light measurement method is to project a structured light pattern into the target area using the light source (such as the laser device), then photograph the target area through a monocular camera, and finally determine the depth information of the target area using the triangulation method. The TOF measurement method determines the depth value of the target area by calculating the time of flight of the photon.

SUMMARY

Embodiments of the disclosure present a method and apparatus for controlling a projector.

In a first aspect, an embodiment of the disclosure provides a method for controlling a projector. The projector includes a light source and a reflector. The method includes: determining position information of a target position in a to-be-projected area; determining a scanning power of scanning the target position based on a pre-generated scanning power table and the position information of the target position, the scanning power table used for characterizing a corresponding relationship between the scanning power and the position information; adjusting a tilt angle of the reflector to change the tilt angle of the reflector, and to enable a light beam incident onto the reflector to be reflected to the target position; and controlling the light source to emit the light beam to the reflector at the determined scanning power.

In some embodiments, the scanning power table is pre-generated by following: acquiring a first image of the to-be-projected area; determining at least one object in the to-be-projected area by image recognition on the first image; determining the scanning power of scanning each of the at least one object based on a corresponding relationship between a preset object and the scanning power; and generating the scanning power table based on the position information and the scanning power of the position of the each of the at least one object.

In some embodiments, the light source is a laser light source, and/or the reflector is a MEMS (micro electro mechanical system) mirror.

In some embodiments, the adjusting a tilt angle of the reflector includes: acquiring position information of a last scanned position of the target position, in response to determining presence of a scanned position; determining whether the target position is adjacent to the last scanned position in a first scanning direction based on the position information of the target position and the position information of the last scanned position; and enabling the reflector to rotate along a first rotation axis, in response to determining the target position being adjacent to the last scanned position in the first scanning direction. The first rotation axis is a rotation axis enabling a reflected light beam of the light beam emitted by the light source to the reflector to deflect along the first scanning direction.

In some embodiments, the adjusting a tilt angle of the reflector further includes: enabling the reflector to rotate along a second rotation axis and the first rotation axis respectively, in response to determining the target position being non-adjacent to the last scanned position in the first scanning direction. The second rotation axis is a rotation axis enabling the reflected light beam of the light beam emitted by the light source to the reflector to deflect along the second scanning direction. The first scanning direction intersects with the second scanning direction.

In a second aspect, an embodiment of the disclosure provides an apparatus for controlling a projector. The projector includes a light source and a reflector. The apparatus includes: a position information determination unit configured for determining position information of a target position in a to-be-projected area; a power determination unit configured for determining a scanning power of scanning the target position based on a pre-generated scanning power table and the position information of the target position, the scanning power table used for characterizing a corresponding relationship between the scanning power and the position information; a tilt angle adjusting unit configured for adjusting a tilt angle of the reflector to change the tilt angle of the reflector, and to enable a light beam incident onto the reflector to be reflected to the target position; and a light source control unit configured for controlling the light source to emit the light beam to the reflector at the determined scanning power.

In some embodiments, the scanning power table is pre-generated by following: acquiring a first image of the to-be-projected area; determining at least one object in the to-be-projected area by image recognition on the first image; determining the scanning power of scanning each of the at least one object based on a corresponding relationship between a preset object and the scanning power; and generating the scanning power table based on the position information and the scanning power of the position of the each of the at least one object.

In some embodiments, the light source is a laser light source, and/or the reflector is a MEMS mirror.

In some embodiments, the tilt angle adjusting unit includes: a position information acquisition module configured for acquiring position information of a last scanned position of the target position, in response to determining presence of a scanned position; a position determining module configured for determining whether the target position is adjacent to the last scanned position in a first scanning direction based on the position information of the target position and the position information of the last scanned position; and a tilt angle adjusting module configured for enabling the reflector to rotate along a first rotation axis, in response to determining the target position being adjacent to the last scanned position in the first scanning direction. The first rotation axis is a rotation axis enabling a reflected light beam of the light beam emitted by the light source to the reflector to deflect along the first scanning direction.

In some embodiments, the tilt angle adjusting module is further used for: enabling the reflector to rotate along a second rotation axis and the first rotation axis respectively, in response to determining the target position being non-adjacent to the last scanned position in the first scanning direction. The second rotation axis is a rotation axis enabling the reflected light beam of the light beam emitted by the light source to the reflector to deflect along the second scanning direction. The first scanning direction intersects with the second scanning direction.

In a third aspect, an embodiment of the disclosure provides a projector, including: a controller including one or more processors; a light source; a reflector; and a memory for storing one or more programs. The one or more programs enable, when executed by the controller, the controller to implement the method according to any one of the implementations in the first aspect.

In a fourth aspect, an embodiment of the disclosure provides a computer readable medium storing a computer program therein. The computer program implements, when executed by a processor, the method according to any one of the implementations in the first aspect.

The method and apparatus for controlling a projector according to the embodiments of the disclosure determine position information of a target position in a to-be-projected area, then determine a scanning power of scanning the target position based on a pre-generated scanning power table and the position information of the target position, then adjust a tilt angle of a reflector, and finally control a light source to emit a light beam to the reflector at the determined scanning power, to enable the light beam to be reflected to the target position, thereby achieving scanning a to-be-projected area at an adjustable scanning power.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
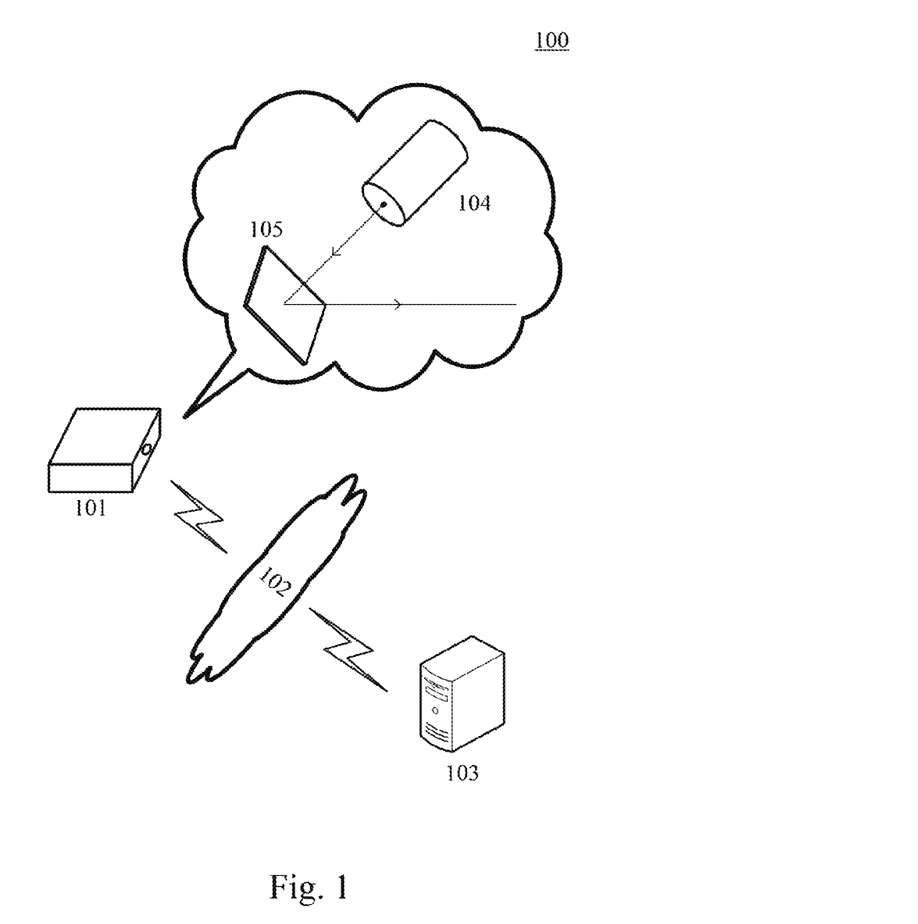
FIG. 1 is a structural diagram of an illustrative system in which the disclosure may be applied.

FIG. 1 shows an illustrative system framework 100 in which the disclosure may be applied.

As shown in FIG. 1, the system framework 100 may include a projector 101, a network 102, and a controller 103. The network 102 is used for providing a communication link medium between the projector 101 and the controller 103. The network 102 may include a variety of connection types, such as a wired communication link, a wireless communication link, or a fiber cable.

The projector 101 may interact with the controller 103 through the network 102, to receive or send messages. The projector 101 may be equipped with a light source 104 and a reflector 105. The light source 104 may be a point light source for emitting light (e.g., point structured light) to the reflector 105. The reflector 105 is used for reflecting the light incident onto the reflector 105 to a target position.

The controller 103 may be installed on the projector 101, or not be installed on the projector 101. The controller 103 is used for controlling the projector 101 in a variety of aspects. For example, the controller 103 can control the light source 104 to emit light to the reflector 105, and the controller 103 can also adjust a tilt angle of the reflector 105 to reflect the light incident onto the reflector 105 to the target position.

It should be noted that the method for controlling a projector provided by the embodiment of the disclosure is generally executed by the controller 103. Accordingly, the apparatus for controlling a projector is generally provided in the controller 103.

It should be noted that the controller may be hardware, or software. When the controller is hardware, it may be implemented as a distributed device cluster including a plurality of devices, or be implemented as a single device. When the controller is software, it may be implemented as a plurality of software systems or software modules (e.g., for providing distributed service), or be implemented as a single software system or software module, which is not specifically limited.

It should be understood that the number of projectors, networks, controllers, light sources, and reflectors in FIG. 1 is only illustrative. There may be any number of projectors, networks, controllers, light sources, and reflectors based on implementation needs.

Figure 2:
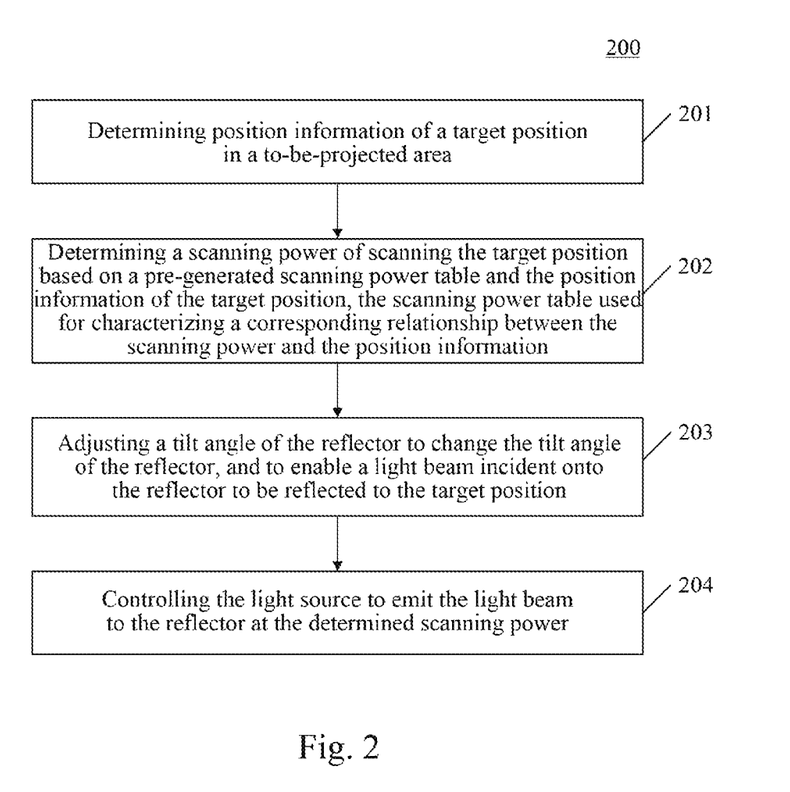
FIG. 2 is a process diagram of an embodiment of a method for controlling a projector according to the disclosure.

Further referring to FIG. 2, a process 200 of an embodiment of a method for controlling a projector according to the disclosure is shown. The process 200 of the method for controlling a projector includes:

step 201: determining position information of a target position in a to-be-projected area.

In the embodiment, the projector (e.g., the projector in FIG. 1) may include a light source and a reflector. An executive subject (e.g., the controller shown in FIG. 1) of the method for controlling a projector may determine position information of a target position in a to-be-projected area. Here, the to-be-projected area refers to an area where a structured light pattern (such as a point structured light pattern, a line structured light pattern, or a surface structured light pattern) will be projected to acquire depth information, e.g., walls, and streets. The position refers to a smallest projection unit for projecting a structured light pattern by the projector in the to-be-projected area, e.g., an area of a light spot pattern formed by reflecting point structured light emitted by the light source to the to-be-projected area. The to-be-projected area may include a plurality of positions, and the target position refers to a current to-be-scanned (or projected) position. The position information may be coordinate information of a position, e.g., the coordinate information includes an abscissa and an ordinate; the position information may also be identifier information of a position, e.g., number information of the position.

step 202: determining a scanning power of scanning the target position based on a pre-generated scanning power table and the position information of the target position, the scanning power table used for characterizing a corresponding relationship between the scanning power and the position information.

In the embodiment, an executive subject (e.g., the controller shown in FIG. 1) of the method for controlling a projector may pre-generate a scanning power table characterizing a corresponding relationship between the scanning power and the position information, and then determine the scanning power of scanning the target position based on the scanning power table and the position information determined in the step 201. For example, the scanning power corresponding to the position information of the target position is found from the scanning power table, and the found scanning power is used as the scanning power of scanning the target position. Here, the scanning power refers to a power of emitting light by a light source when scanning a position. The scanning power may be identical or different for different positions.

The scanning power of scanning a position is usually affected by brightness of ambient light. In general, the higher the brightness of the ambient light is, the higher the scanning power is; and the lower the brightness of the ambient light is, the lower the scanning power is. For example, when a to-be-projected area is exposed to sunlight, the light source needs to emit light at a high enough scanning power such that a structured light pattern can be formed in the to-be-projected area.

As an example, the scanning power table may be pre-generated based on the brightness of the ambient light. For example, the executive subject can first acquire the brightness information of the ambient light, and then determine the scanning power of scanning the position in the to-be-projected area based on the corresponding relationship between the preset brightness information of the ambient light and the scanning power (e.g., obtained through repeated experiments).

In addition, the scanning power of scanning the position is also affected by the object type in the to-be-projected area. That is, the scanning power may vary depending on the objects in the to-be-projected area. For example, when the object in the to-be-projected area is the sky, the scanning power may be 0 (because of failure to form a structured light pattern). For example, when the object in the to-be-projected area is a person (or other animals), and the light source is a laser light source (or other light sources that can emit light harmful to the human body), the scanning power should fall within a specified safety range (e.g., less than 100 mW, no eye exposure). For example, when the object in the to-be-projected area is a house, a car, an obstacle, or the like, the scanning power may be high (relative to the person, or the sky).

In some optional implementations of the embodiment, the scanning power table is pre-generated by following: acquiring a first image of the to-be-projected area; determining at least one object in the to-be-projected area by image recognition on the first image; determining the scanning power of scanning each of the at least one object based on a corresponding relationship between a preset object and the scanning power; and generating the scanning power table based on the position information and the scanning power of the position of the each of the at least one object.

Figure 3:
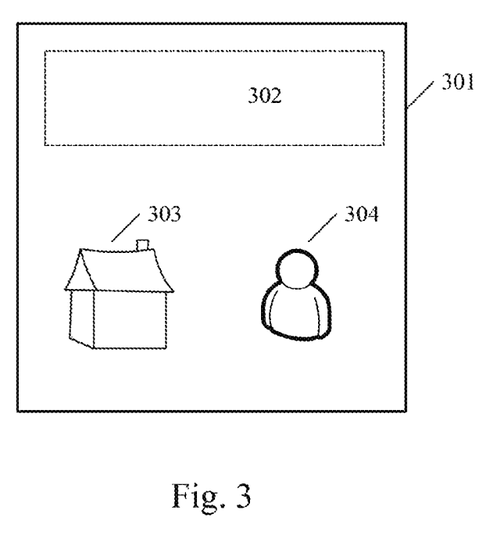
FIG. 3 is a schematic diagram for generating a scanning power table according to an embodiment of the disclosure.

As an example of the implementation, FIG. 3 shows a schematic diagram of generating a scanning power table. As shown in FIG. 3, first, a first image of a to-be-projected area 301 may be acquired through an image sensor (or camera, or the like); then, at least one object (e.g., the sky 302, a house 303, or a person 304) in the to-be-projected area is determined by image identification on the first image; then, the scanning power of scanning the each object (the scanning power of scanning the sky is 0, the scanning power of scanning the person is 1 mW, and the scanning power of scanning the house is 100 mW) is determined based on the corresponding relationship between the preset object and the scanning power (e.g., the foregoing corresponding relationship between the sky, the person, the house, or the like and the scanning power); and finally, the scanning power table is generated based on the position information and the scanning power of the position of the each of the at least one object.

Thus it can be seen that, the scanning power table is pre-generated using the above approach, enabling the projector to not only improve the security (e.g., will not cause damage to the human body), but also reduce the overall power consumption of the light source whilst ensuring the projection effect, when scanning the to-be-projected area.

The embodiment describes the scanning power table pre-generated by the executive subject, but this is not limited in the disclosure. For example, the scanning power table may be pre-generated by other device or the controller, and then acquired by the executive subject. This is not specifically limited in the disclosure.

step 203: adjusting a tilt angle of the reflector to change the tilt angle of the reflector, and to enable a light beam incident onto the reflector to be reflected to the target position.

In the embodiment, the executive subject (e.g., the controller shown in FIG. 1) of the method for controlling a projector may adjust a tilt angle of the reflector based on a positional relationship between the light source and the target position (e.g., determining based on position information of the light source and the position information of the target position). The adjusting a tilt angle of the reflector (equivalent to changing a reflection direction of light) enables a light beam incident onto the reflector to be reflected to the target position.

Here, the adjusting a tilt angle of the reflector can be implemented by the executive subject through sending a tilt angle adjusting instruction (e.g., an instruction of "clockwise rotation along the first rotation axis by 1 degree") to the projector, or be implemented in other appropriate way. For example, the adjusting a tilt angle of the reflector is implemented by a transmission component mechanically connected with the reflector. This is not specifically limited in the disclosure, as long as the light beam incident onto the reflector can be reflected to the target position.

step 204: controlling the light source to emit the light beam to the reflector at the determined scanning power.

In the embodiment, the executive subject (e.g., the controller shown in FIG. 1) of the method for controlling a projector can control the light source, to enable the light source to emit the light beam to the reflector at the scanning power determined in the step 202, thereby enabling the light beam to be reflected to the target position through the reflector adjusted in the step 203, and implementing scanning (or projecting) the target position.

Here, the controlling the light source can be implemented by the executive subject through sending a light emission instruction to the projector (e.g., an instruction of "emitting a light beam to the reflector at the determined scanning power"), or be implemented in other appropriate way. For example, an intensity of the light beam incident onto the reflector is adjusted by adding a filter device between the light source and the reflector. This is not specifically limited in the disclosure, as long as the light source can emit the light beam to the reflector at the determined scanning power.

It should be understood that the light source can emit a light beam in a constant direction, or the light source can emit a light beam towards the reflector in an adjustable direction, which is not specifically limited in the disclosure.

In some optional implementations of the embodiment, the light source may be a laser light source. Because of excellent directivity, the laser light source can form a clear structured light pattern in the to-be-projected area. The laser light source may be a monochromatic light source, for example, a red laser light source, a green laser light source, or a blue laser light source.

In some optional implementations of the embodiment, the reflector may be a MEMS (micro electro mechanical system) mirror. The MEMS refers to a micro-device or system that has a production size of several millimeters or even smaller, which is produced by integrating precision processing technologies, such as photoetching, corrosion, and thin film, based on microelectronic technology. The MEMS mirror may be in the size of 1 mm to 2 mm, or even smaller. Compared with the conventional reflector, the MEMS mirror can reduce the size of the projector, and reduce costs.

It should be noted that, while the embodiment describes scanning a position (i.e., the target position), one of ordinary skill in the art will appreciate that, each position in the to-be-projected area can be scanned by repeatedly executing the step 201 to the step 204.

Moreover, those skilled in the art will appreciate that, when each position in the to-be-projected area is scanned at a high speed (e.g., it takes less than 1/60 seconds, 1/120 seconds, or the like to complete scanning the to-be-projected area), due to a visual persistence effect (or known as afterglow), it is equivalent to directly projecting a structured light pattern into the to-be-projected area. An image sensor (or camera, or the like) can acquire a complete structured light pattern formed by light spots of the each position, for generating depth information of the to-be-projected area.

Figure 4:
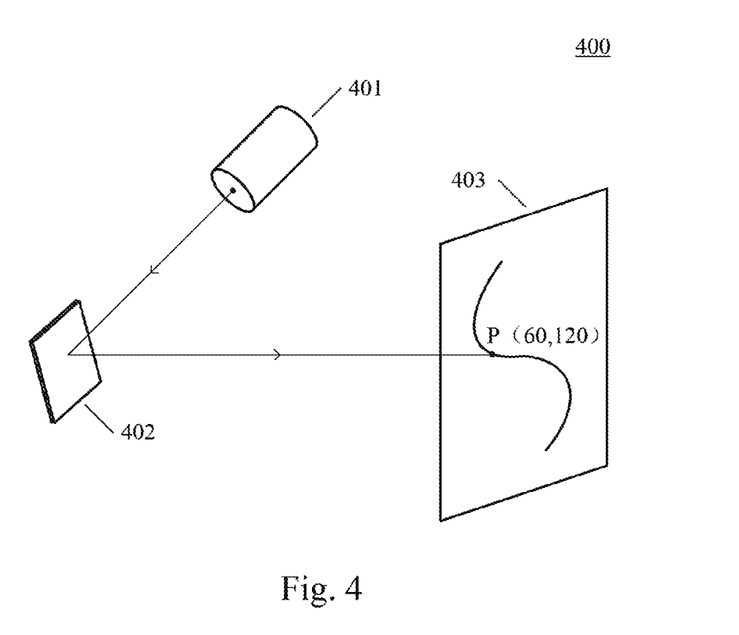
FIG. 4 is a schematic diagram of an application scenario of a method for controlling a projector according to the disclosure.

Please further refer to FIG. 4. FIG. 4 is a schematic diagram of an application scenario 400 of a method for controlling a projector according to the embodiment. In the application scenario of FIG. 4, first, the controller (not shown) determines position information of a target position P in the to-be-projected area 403 (e.g., coordinate information of the target position P is (60, 120)); then the controller determines a scanning power (e.g., 100 mW) of scanning the target position P based on a pre-generated scanning power table and the position information of the target position P; then, the controller adjusts a tilt angle of a reflector 402 (e.g., enabling the reflector 402 to clockwise rotate along a rotation axis in parallel with a long side of the reflector 402 by 0.1 degree), enabling a light beam incident onto the reflector 402 to be reflected to the target position P; and finally, the controller controls a light source 401 to emit a light beam to the reflector 402 at a determined scanning power (e.g., 100 mW), where a travel path of light is as indicated by solid lines with arrows in the figure, thereby forming a light spot pattern at the target position P, and implementing scanning the target position P.

The method for controlling a projector according to the above embodiments of the disclosure determines position information of a target position in a to-be-projected area, then determines a scanning power of scanning the target position based on a pre-generated scanning power table and the position information of the target position, then adjusts a tilt angle of a reflector, and finally controls a light source to emit a light beam to the reflector at the determined scanning power, to enable the light beam to be reflected to the target position, thereby achieving scanning a to-be-projected area at an adjustable scanning power.

Figure 5:
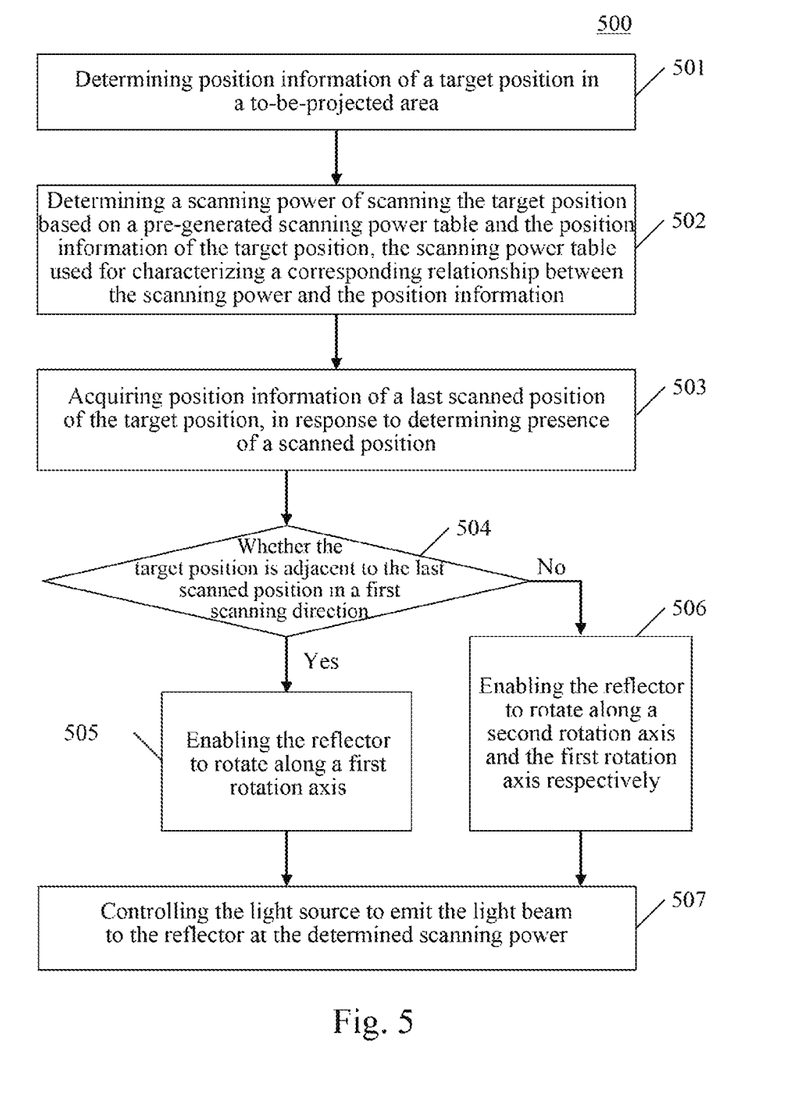
FIG. 5 is a process diagram of another embodiment of a method for controlling a projector according to the disclosure.

Further referring to FIG. 5, a process 500 of another embodiment of a method for controlling a projector is shown. The process 500 of the method for controlling a projector includes:

step 501: determining position information of a target position in a to-be-projected area.

In the embodiment, the projector (e.g., the projector in FIG. 1) may include a light source and a reflector. An executive subject (e.g., the controller shown in FIG. 1) of the method for controlling a projector may determine position information of a target position in a to-be-projected area. Here, the to-be-projected area refers to an area where a structured light pattern (such as a point structured light pattern, a line structured light pattern, or a surface structured light pattern) will be projected to acquire depth information, e.g., walls, and streets. The position refers to a smallest projection unit for projecting a structured light pattern by a projector in a to-be-projected area, e.g., an area of a light spot pattern formed by reflecting point structured light emitted by a light source to the to-be-projected area. The to-be-projected area may include a plurality of positions, and the target position refers to a current to-be-scanned (or projected) position. The position information may be coordinate information of a position, e.g., the coordinate information includes an abscissa and an ordinate; the position information may also be identifier information of a position, e.g., number information of the position.

step 502: determining a scanning power of scanning the target position based on a pre-generated scanning power table and the position information of the target position, the scanning power table used for characterizing a corresponding relationship between the scanning power and the position information.

In the embodiment, an executive subject (e.g., the controller shown in FIG. 1) of the method for controlling a projector may pre-generate a scanning power table characterizing a corresponding relationship between the scanning power and the position information, and then determine the scanning power of scanning the target position based on the scanning power table and the position information determined in the step 501. For example, the scanning power corresponding to the position information of the target position is found from the scanning power table, and the found scanning power is used as the scanning power of scanning the target position. Here, the scanning power refers to a power of emitting light by a light source when scanning a position. The scanning power may be identical or different for different positions.

step 503: acquiring position information of a last scanned position of the target position, in response to determining presence of a scanned position.

In the embodiment, the executive subject (e.g., the controller shown in FIG. 1) of the method for controlling a projector may first determine whether there is a scanned position, and then acquire position information of a last scanned position of the target position, in response to presence of the scanned position (i.e., the target position is not the first scanned position). For example, a position P' in FIG. 6A and FIG. 6B is the last scanned position of the target position P.

step 504: determining whether the target position is adjacent to the last scanned position in a first scanning direction based on the position information of the target position and the position information of the last scanned position.

Figure 6A:
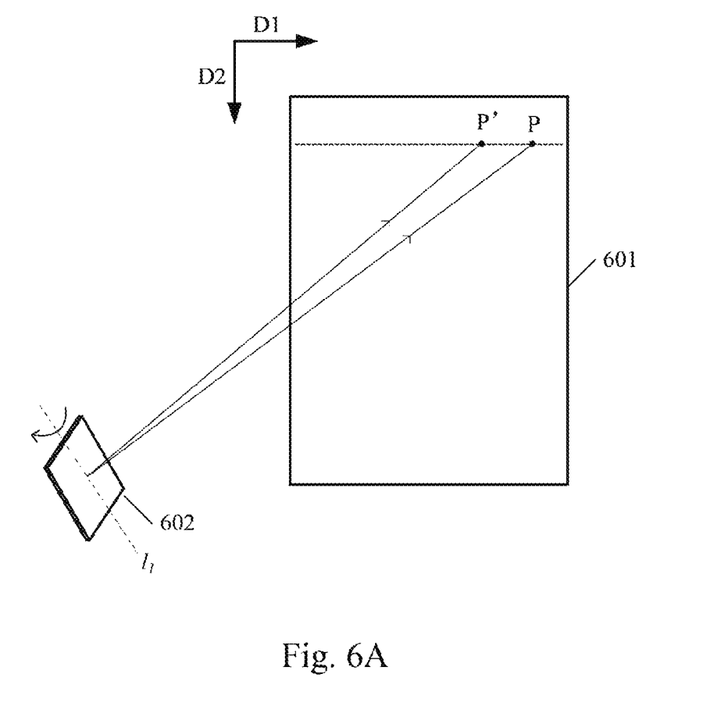
FIG. 6A is a schematic diagram of an implementation of the embodiment shown in FIG. 5.
Figure 6B:
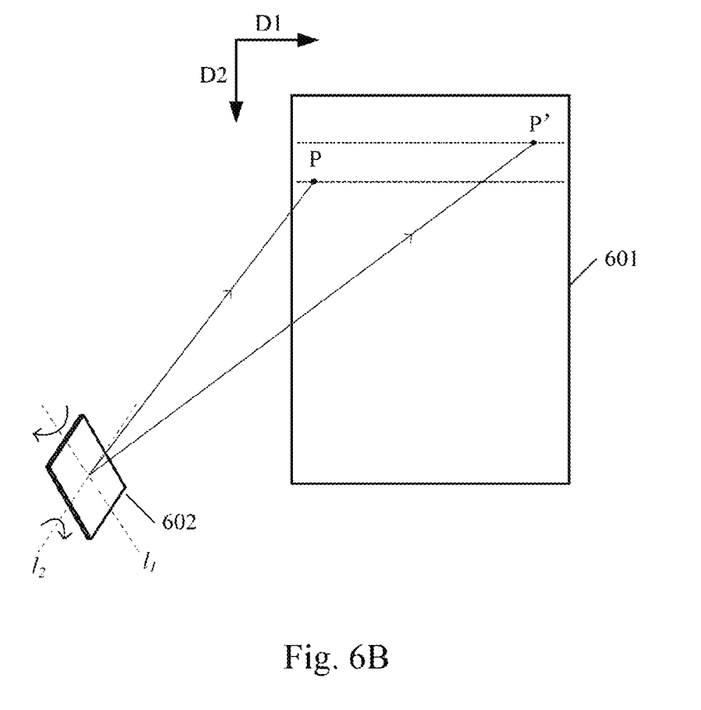
FIG. 6B is a schematic diagram of another implementation of the embodiment shown in FIG. 5.

In the embodiment, the executive subject (e.g., the controller shown in FIG. 1) of the method for controlling a projector may determine whether the target position is adjacent to the last scanned position in a first scanning direction based on the position information of the target position (e.g., the position P in FIG. 6A and FIG. 6B) and the position information of the last scanned position (e.g., the position P' in FIG. 6A and FIG. 6B). For example, the target position P in FIG. 6A is adjacent to the last scanned position P' in the first scanning direction D1, while the target position P in FIG. 6B is non-adjacent to the last scanned position P' in the first scanning direction D1 may be determined.

step 505: enabling the reflector to rotate along a first rotation axis, in response to determining the target position being adjacent to the last scanned position in the first scanning direction, the first rotation axis being a rotation axis enabling a reflected light beam of the light beam emitted by the light source to the reflector to deflect along the first scanning direction.

In the embodiment, because the target position is adjacent to the last scanned position in the first scanning direction, the executive subject (e.g., the controller shown in FIG. 1) of the method for controlling a projector can enable the reflector to rotate along a first rotation axis. Here, the first rotation axis is a rotation axis enabling a reflected light beam of the light beam emitted by the light source to the reflector to deflect along the first scanning direction.

Specifically, referring to FIG. 6A, a schematic diagram of an optional implementation of the embodiment shown in FIG. 5 is shown. As shown in FIG. 6A, in a to-be-projected area 601, the target position P is adjacent to the last scanned position P' in the first scanning direction D1, i.e., a reflected light beam can be deflected from the last scanned position P' to the target position P by the executive subject through enabling the reflector 602 to rotate along the first rotation axis $l_1$. Here, the first rotation axis $l_1$ is a rotation axis enabling a reflected light beam (a solid line including an arrow) of the light beam emitted by the light source (not shown) to the reflector 602 to deflect along the first scanning direction D1.

In the embodiment, by enabling the reflector to rotate along the first rotation axis, scanning the to-be-projected area point by point in the first scanning direction is implemented.

step 506: enabling the reflector to rotate along a second rotation axis and the first rotation axis respectively, in response to determining the target position being non-adjacent to the last scanned position in the first scanning direction. The second rotation axis is a rotation axis enabling the reflected light beam of the light beam emitted by the light source to the reflector to deflect along the second scanning direction. The first scanning direction intersects with the second scanning direction.

In the embodiment, because the target position is non-adjacent to the last scanned position in the first scanning direction, the executive subject (e.g., the controller shown in FIG. 1) of the method for controlling a projector may enable the reflector to first rotate along a second rotation axis, and then rotate along the first rotation axis. Here, the second rotation axis is a rotation axis enabling a reflected light beam of the light beam emitted by the light source to the reflector to deflect along the second scanning direction. The first scanning direction intersects with the second scanning direction.

Specifically, referring to FIG. 6B, a schematic diagram of an optional implementation of the embodiment shown in FIG. 5 is shown. As shown in FIG. 6B, in the to-be-projected area 601, the target position P is not adjacent to the last scanned position P' in the first scanning direction D1, i.e., a reflected light beam needs to be deflected from the last scanned position P' to the target position P by the executive subject through enabling the reflector 602 to first rotate along the second rotation axis $l_2$, and then rotate along the first rotation axis $l_1$. Here, the second rotation axis $l_2$ is a rotation axis enabling a reflected light beam (a solid line including an arrow) of the light beam emitted by the light source (not shown) to the reflector 602 to deflect along the second scanning direction D2. The second direction D2 intersects with the first direction D1.

In the embodiment, by enabling the reflector to first rotate along the second rotation axis, and then rotate along the first rotation axis, scanning the to-be-projected area line by line in the second scanning direction is implemented.

While FIG. 6A and FIG. 6B illustrate the second direction D2 perpendicularly intersecting with the first direction D1, this is merely illustrative. The second direction D2 may not perpendicularly intersect with the first direction D1, which may be set by those skilled in the art based on actual needs in an application scenario.

A situation of presence of a scanned position has been described hereinbefore. It should be understood that when there is no scanned position, the target scanning point is a first scanned position. In this case, the reflector may be enabled to rotate along at least one of the first rotation axis or the second rotation axis (depending upon the initial tilt angle of the reflector), to enable the light beam incident onto the reflector to be reflected to the target position.

step 507: controlling the light source to emit the light beam to the reflector at the determined scanning power.

In the embodiment, the executive subject (e.g., the controller shown in FIG. 1) of the method for controlling a projector can control the light source, to enable the light source to emit the light beam to the reflector at the scanning power determined in the step 502, thereby enabling the light beam to be reflected to the target position through the reflector adjusted in the step 505 or the reflector adjusted in the step 506, and implementing scanning (or projecting) the target position.

As can be seen from FIG. 5, compared with the embodiment corresponding to FIG. 2, the process 500 of the method for controlling a projector according to the embodiment highlights adjusting a tilt angle of the reflector. Therefore, the solution according to the embodiment can scan the to-be-projected area point by point and line by line.

Figure 7:
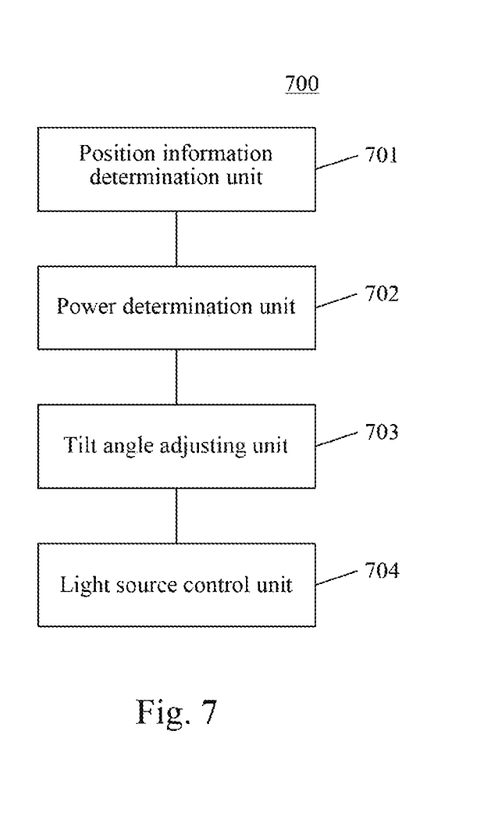
FIG. 7 is a schematic diagram of structure of an embodiment of an apparatus for controlling a projector according to the disclosure.

Further referring to FIG. 7, as an implementation of the method shown in the above figures, the disclosure provides an embodiment of an apparatus for controlling a projector. The embodiment of the apparatus corresponds to the embodiment of the method shown in FIG. 2. The apparatus may be specifically applied to, e.g., a controller.

As shown in FIG. 7, the apparatus 700 for controlling a projector according to the embodiment includes: a position information determination unit 701, a power determination unit 702, a tilt angle adjusting unit 703, and a light source control unit 704. The position information determination unit 701 is configured for determining position information of a target position in a to-be-projected area; the power determination unit 702 is configured for determining a scanning power of scanning the target position based on a pre-generated scanning power table and the position information of the target position, the scanning power table used for characterizing a corresponding relationship between the scanning power and the position information; the tilt angle adjusting unit 703 is configured for adjusting a tilt angle of the reflector to change the tilt angle of the reflector, and to enable a light beam incident onto the reflector to be reflected to the target position; and the light source control unit 704 is configured for controlling the light source to emit the light beam to the reflector at the determined scanning power.

In the embodiment, the projector (e.g., the projector in FIG. 1) may include a light source and a reflector. The position information determination unit 701 of the apparatus 700 for controlling a projector may determine position information of a target position in a to-be-projected area. Here, the to-be-projected area refers to an area where a structured light pattern (such as a point structured light pattern, a line structured light pattern, or a surface structured light pattern) will be projected to acquire depth information, e.g., walls, and streets. The position refers to a smallest projection unit for projecting a structured light pattern by a projector in a to-be-projected area, e.g., an area of a light spot pattern formed by reflecting point structured light emitted by a light source to the to-be-projected area. The to-be-projected area may include a plurality of positions, and the target position refers to a current to-be-scanned (or projected) position. The position information may be coordinate information of a position, e.g., the coordinate information includes an abscissa and an ordinate; the position information may also be identifier information of a position, e.g., number information of the position.

In the embodiment, the power determination unit 702 pre-generates a scanning power table characterizing a corresponding relationship between the scanning power and the position information, and then determines the scanning power of scanning the target position based on the scanning power table and the position information determined by the position information determination unit 701. For example, the scanning power corresponding to the position information of the target position is found from the scanning power table, and the found scanning power is used as the scanning power of scanning the target position. Here, the scanning power refers to a power of emitting light by a light source when scanning a position. The scanning power may be identical or different for different positions.

In some optional implementations of the embodiment, the scanning power table is pre-generated by following: acquiring a first image of the to-be-projected area; determining at least one object in the to-be-projected area by image recognition on the first image; determining the scanning power of scanning each of the at least one object based on a corresponding relationship between a preset object and the scanning power; and generating the scanning power table based on the position information and the scanning power of the position of the each of the at least one object.

In the embodiment, the tilt angle adjusting unit 703 may adjust a tilt angle of the reflector based on a positional relationship between the light source and the target position (e.g., determining based on position information of the light source and the position information of the target position). The adjusting a tilt angle of the reflector (equivalent to changing a reflection direction of light) enables a light beam incident onto the reflector to be reflected to the target position.

In the embodiment, the light source control unit 704 can control the light source, to enable the light source to emit the light beam to the reflector at the scanning power determined by the power determination unit 702, thereby enabling the light beam to be reflected to the target position through the reflector adjusted by the tilt angle adjusting unit 703, and implementing scanning (or projecting) the target position.

In some optional implementations of the embodiment, the light source may be a laser light source. Because of excellent directivity, the laser light source can form a clear structured light pattern in the to-be-projected area. The laser light source may be a monochromatic light source, for example, a red laser light source, a green laser light source, or a blue laser light source.

In some optional implementations of the embodiment, the reflector may be a MEMS mirror. The MEMS refers to a micro-device or system that has a production size of several millimeters or even smaller, which is produced by integrating precision processing technologies, such as photoetching, corrosion, and thin film, based on microelectronic technology. The MEMS mirror may be in the size of 1 mm to 2 mm, or even smaller. Compared with the conventional reflector, the MEMS mirror can reduce the size of the projector, and reduce costs.

In some optional implementations of the embodiment, the tilt angle adjusting unit 703 includes a position information acquisition module, a position determining module, and a tilt angle adjusting module. The position information acquisition module is configured for acquiring position information of a last scanned position of the target position, in response to determining presence of a scanned position; the position determining module is configured for determining whether the target position is adjacent to the last scanned position in a first scanning direction based on the position information of the target position and the position information of the last scanned position; and the tilt angle adjusting module is configured for enabling the reflector to rotate along a first rotation axis, in response to determining the target position being adjacent to the last scanned position in the first scanning direction. The first rotation axis is a rotation axis enabling a reflected light beam of the light beam emitted by the light source to the reflector to deflect along the first scanning direction.

In some optional implementations of the embodiment, the tilt angle adjusting module is further used for: enabling the reflector to rotate along a second rotation axis and the first rotation axis respectively, in response to determining the target position being non-adjacent to the last scanned position in the first scanning direction. The second rotation axis is a rotation axis enabling the reflected light beam of the light beam emitted by the light source to the reflector to deflect along the second scanning direction. The first scanning direction intersects with the second scanning direction.

The apparatus for controlling a projector according to the above embodiments of the disclosure determines position information of a target position in a to-be-projected area, then determines a scanning power of scanning the target position based on a pre-generated scanning power table and the position information of the target position, then adjusts a tilt angle of a reflector, and finally controls a light source to emit a light beam to the reflector at the determined scanning power, to enable the light beam to be reflected to the target position, thereby achieving scanning a to-be-projected area at an adjustable scanning power.

Figure 8:
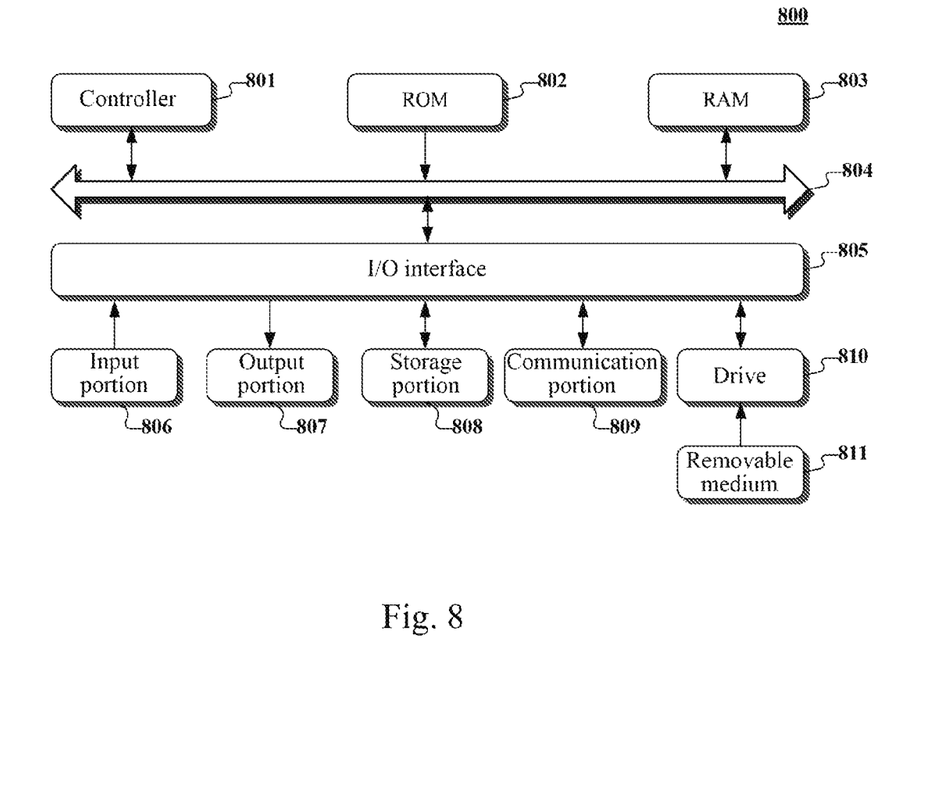
FIG. 8 is a schematic diagram of a structure of a computer system suitable for implementing a projector according to an embodiment of the disclosure.

Referring to FIG. 8, a schematic structural diagram of a computer system 800 adapted to implement a projector of the embodiments of the present application is shown. The projector shown in FIG. 8 is merely an example and should not impose any restriction on the function and scope of use of the embodiments of the present application.

As shown in FIG. 8, the computer system 800 includes a controller 801, the controller 801 includes one or more central processing units (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a mouse etc.; an output portion 807 comprising a cathode ray tube (CRT), a liquid crystal display device (LCD), a speaker etc.; a storage portion 808 including a hard disk and the like; and a communication portion 809 comprising a network interface card, such as a LAN card and a modem. The communication portion 809 performs communication processes via a network, such as the Internet. A drive 810 is also connected to the I/O interface 805 as required. A removable medium 811, such as a magnetic disk, an optical disk, a magneto-optical disk, and a semiconductor memory, may be installed on the drive 810, to facilitate the retrieval of a computer program from the removable medium 811, and the installation thereof on the storage portion 808 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 809, and/or may be installed from the removable media 811. The computer program, when executed by the central processing unit (CPU) 801, implements the above mentioned functionalities as defined by the methods of the present disclosure.

It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a position information determination unit, a power determination unit, a tilt angle adjusting unit, and a light source control unit, where the names of these units or modules do not in some cases constitute a limitation to such units or modules themselves. For example, the position information determination unit may also be described as "a unit for determining position information of a target position in a to-be-projected area."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: determine position information of a target position in a to-be-projected area; determine a scanning power of scanning the target position based on a pre-generated scanning power table and the position information of the target position, the scanning power table used for characterizing a corresponding relationship between the scanning power and the position information; adjust a tilt angle of the reflector to change the tilt angle of the reflector, and to enable a light beam incident onto the reflector to be reflected to the target position; and control the light source to emit the light beam to the reflector at the determined scanning power.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for controlling a projector, the projector comprising a light source and a reflector, the method comprising:
    determining position information of a target position in a to-be-projected area;
    determining a scanning power of scanning the target position based on a pre-generated scanning power table and the position information of the target position, the scanning power table used for characterizing a corresponding relationship between the scanning power and the position information;
    adjusting a tilt angle of the reflector to change the tilt angle of the reflector, and to enable a light beam incident onto the reflector to be reflected to the target position; and
    controlling the light source to emit the light beam to the reflector at the determined scanning power.

2. The method according to claim 1, wherein the scanning power table is pre-generated by following:
    acquiring a first image of the to-be-projected area;
    determining at least one object in the to-be-projected area by image recognition on the first image;
    determining the scanning power of scanning each of the at least one object based on a corresponding relationship between a preset object and the scanning power; and
    generating the scanning power table based on the position information and the scanning power of the position of the each of the at least one object.

3. The method according to claim 1, wherein the light source is a laser light source, and/or the reflector is a MEMS mirror.

4. The method according to claim 1, wherein the adjusting a tilt angle of the reflector comprises:
    acquiring position information of a last scanned position of the target position, in response to determining presence of a scanned position;
    determining whether the target position is adjacent to the last scanned position in a first scanning direction based on the position information of the target position and the position information of the last scanned position; and
    enabling the reflector to rotate along a first rotation axis, in response to determining the target position being adjacent to the last scanned position in the first scanning direction, the first rotation axis being a rotation axis enabling a reflected light beam of the light beam emitted by the light source to the reflector to deflect along the first scanning direction.

5. The method according to claim 4, wherein the adjusting a tilt angle of the reflector further comprises:
    enabling the reflector to rotate along a second rotation axis and the first rotation axis respectively, in response to determining the target position being non-adjacent to the last scanned position in the first scanning direction, the second rotation axis being a rotation axis enabling the reflected light beam of the light beam emitted by the light source to the reflector to deflect along the second scanning direction, the first scanning direction intersecting with the second scanning direction.

6. An apparatus for controlling a projector, the projector comprising a light source and a reflector, the apparatus comprising:
    at least one processor; and
    a memory storing instructions, the instructions when executed by the at least one processor, cause the at least one processor to perform operations, the operations comprising:
    determining position information of a target position in a to-be-projected area;
    determining a scanning power of scanning the target position based on a pre-generated scanning power table and the position information of the target position, the scanning power table used for characterizing a corresponding relationship between the scanning power and the position information;
    adjusting a tilt angle of the reflector to change the tilt angle of the reflector, and to enable a light beam incident onto the reflector to be reflected to the target position; and
    controlling the light source to emit the light beam to the reflector at the determined scanning power.

7. The apparatus according to claim 6, wherein the scanning power table is pre-generated by following:
    acquiring a first image of the to-be-projected area;
    determining at least one object in the to-be-projected area by image recognition on the first image;
    determining the scanning power of scanning each of the at least one object based on a corresponding relationship between a preset object and the scanning power; and
    generating the scanning power table based on the position information and the scanning power of the position of the each of the at least one object.

8. The apparatus according to claim 6, wherein the light source is a laser light source, and/or the reflector is a MEMS mirror.

9. The apparatus according to claim 6, wherein the adjusting a tilt angle of the reflector comprises:
   acquiring position information of a last scanned position of the target position, in response to determining presence of a scanned position;
   determining whether the target position is adjacent to the last scanned position in a first scanning direction based on the position information of the target position and the position information of the last scanned position; and
   enabling the reflector to rotate along a first rotation axis, in response to determining the target position being adjacent to the last scanned position in the first scanning direction, the first rotation axis being a rotation axis enabling a reflected light beam of the light beam emitted by the light source to the reflector to deflect along the first scanning direction.

10. The apparatus according to claim 9, wherein the adjusting a tilt angle of the reflector further comprises:
   enabling the reflector to rotate along a second rotation axis and the first rotation axis respectively, in response to determining the target position being non-adjacent to the last scanned position in the first scanning direction, the second rotation axis being a rotation axis enabling the reflected light beam of the light beam emitted by the light source to the reflector to deflect along the second scanning direction, the first scanning direction intersecting with the second scanning direction.

11. A projector, comprising:
   a controller including one or more processors;
   a light source;
   a reflector; and
   a memory for storing one or more programs;
   the one or more programs enabling, when executed by the controller, the controller to implement the method according to claim 1.

12. A non-transitory computer-readable storage medium storing a computer program, the computer program when executed by one or more processors, causes the one or more processors to perform operations, the operations comprising:
   determining position information of a target position in a to-be-projected area;
   determining a scanning power of scanning the target position based on a pre-generated scanning power table and the position information of the target position, the scanning power table used for characterizing a corresponding relationship between the scanning power and the position information;
   adjusting a tilt angle of the reflector to change the tilt angle of the reflector, and to enable a light beam incident onto the reflector to be reflected to the target position; and
   controlling the light source to emit the light beam to the reflector at the determined scanning power.

* * * * *